(12) United States Patent
Mieda et al.

(10) Patent No.: US 7,810,352 B2
(45) Date of Patent: Oct. 12, 2010

(54) HEAT EXCHANGE HAVING ADSORBING CORE FOR USE IN REFRIGERATING SYSTEM

(75) Inventors: Hiroshi Mieda, Kariya (JP); Seiji Inoue, Nukata-gun (JP); Satoshi Inoue, Kariya (JP)

(73) Assignee: Denso Corporation, Kariya (JP)

( * ) Notice: Subject to any disclaimer, the term of this patent is extended or adjusted under 35 U.S.C. 154(b) by 1038 days.

(21) Appl. No.: 11/544,355

(22) Filed: Oct. 9, 2006

(65) Prior Publication Data
US 2007/0095277 A1    May 3, 2007

(30) Foreign Application Priority Data
Nov. 1, 2005    (JP)    ............................. 2005-318462

(51) Int. Cl.
*F25B 15/00*    (2006.01)
(52) U.S. Cl. ........................................ 62/476; 62/238.3
(58) Field of Classification Search ................... 62/476, 62/480, 238.3; 117/217; 165/104.34, 157
See application file for complete search history.

(56) References Cited

U.S. PATENT DOCUMENTS 5,768,908 A * 6/1998 Tanaka et al. .................. 62/332
5,863,326 A * 1/1999 Nause et al. ................. 117/217

FOREIGN PATENT DOCUMENTS

| JP | 06-170219 | 6/1994 |
| JP | 2000-018767 | 1/2000 |
| JP | 2005-111425 | 4/2005 |

* cited by examiner

*Primary Examiner*—Melvin Jones
(74) *Attorney, Agent, or Firm*—Harness, Dickey & Pierce, PLC (57) ABSTRACT

A heat exchanger having an adsorbing core is advantageously applied to a refrigerating system mounted on an automotive vehicle. The adsorbing core absorbs heat from coolant and gives heat to the coolant thereby to perform heat-exchanging operation. The adsorbing core is composed of a heat exchanging member such as tubes or fins of the heat exchanger and a attracting layer connected to the surface of the heat exchanging member. A seed crystal retaining layer is firmly connected to the surface of the heat exchanging member, and the attractant crystals forming the attractant layer are grown on the seed crystals by a hydrothermal crystal growth method. Since the attracting layer is uniformly formed and firmly connected to the surface of the heat exchanging member, heat is quickly transferred between the attractant layer and the heat exchanging member.

18 Claims, 6 Drawing Sheets

HEAT EXCHANGE HAVING ADSORBING CORE FOR USE IN REFRIGERATING SYSTEM

CROSS-REFERENCE TO RELATED APPLICATION

This application is based upon and claims benefit of priority of Japanese Patent Application No. 2005-318462 filed on Nov. 1, 2005, the content of which is incorporated herein by reference.

BACKGROUND OF THE INVENTION

1. Field of the Invention

The present invention relates to a heat exchanger having an adsorbing core and a method of manufacturing such a core.

2. Description of Related Art

Recently, technologies for collecting or recuperating exhausted heat are becoming important. In particular, a technology for collecting heat that is generated in a high volume at a relatively low temperature lower than 100 degrees is urged to be established. An adsorbing type refrigerator is one of the important devices for collecting exhausted heat. However, there is a problem that the heat exchanger of this type is large in size because an adsorbing core requires a large space. Accordingly, it is highly desirable to provide a technology for reducing the size of the adsorbing core.

Quick release of the heat generated by attracting fluid greatly contributes to reduction of the size of the heat exchanger. Attracting ability of attractants $Q(W)$ is expressed in the following formula: $Q(W)=V \times W \times L$, where $V$ (g/g·s) is attracting velocity, $W$ (g) is weight of the attractants, and $L$ (J/g) is latent heat of fluid to be attracted. As clear from this formula, a desired amount of the attractant ability $Q$ can be attained by increasing the attracting velocity without increasing an amount of attractants. This means that if the heat generated on the attractants is quickly dissipated, the attracting velocity can be increased. To increase the heat dissipation speed, the attractants have to be closely connected to an outer surface of a heat exchanger. In other words, a contacting heat resistance between the attractants and the heat exchanger has to be reduced.

An example of a method for firmly connecting attractants to a surface of a heat exchanger is disclosed in JP-A-2005-111425. In this method, the outer surface of the heat exchanger is made rough before the attractants are attached. Seed crystals of the attractants are attached to the rough surface, and then the attractants are grown on the seed crystals by a hydrothermal crystal growth method.

In this method, however, the seed crystals are simply attached to the rough surface without holding them thereon. Accordingly, the seed crystals cannot be held on the surface with a sufficiently high connecting force though a contacting area of the surface is increased by making the surface rough. There is a possibility that the seed crystals may drop off from the surface. When the surface of the heat exchanger on which the seed crystals are attached is dipped in a solution for growing crystals in the hydrothermal crystal growth method, the seed crystals may drop off from the surface. At a portion of the surface where the seed crystals dropped off, the attractant crystals cannot be grown properly. Therefore, an effective area of the attractant layer becomes narrow, and it is difficult to make the heat exchanger compact.

SUMMARY OF THE INVENTION

The present invention has been made in view of the above-mentioned problem, and an object of the present invention is to provide an improved adsorbing core of a heat exchanger, in which an attractant layer is firmly held on an outer surface of the heat exchanger.

A heat exchanger having the adsorbing core according to the present invention is advantageously used in a refrigerating system mounted on an automotive vehicle. The adsorbing core is composed of a heat exchanging member such as tubes or fines constituting the heat exchanger and an attracting layer connected to the surface of the heat exchanging member. The fluid-attractant layer absorbs heat from a coolant such as water to thereby liquefy the coolant. The liquefied coolant adheres to the attractant layer. The liquid coolant adhering to the attractant layer is vaporized by giving heat to it, thereby regenerating the attractant layer. Exhaust heat of an internal combustion engine, such as heat in a radiator coolant, may be used as the heat for regenerating the attractant layer.

The attractant layer is formed on the surface of the heat exchanging member in the following manner. A mixture of seed crystals of the attractant such as zeolite and retainer particles such as copper particles is pained on the surface of the heat exchanging member. Then, a seed crystal retaining layer is formed by sintering the retainer particles. The seed crystal retaining layer is firmly connected to the surface of the heat exchanging member while retaining the seed crystals in inner spaces of the retaining layer. To firmly and uniformly connect the seed crystal retaining layer to the surface of the heat exchanging member, particle sizes of the seed crystals and the retainer particles have to be set within proper ranges. Then, the heat exchanging member, to the surface of which the seed crystal retaining layer is connected, is subjected to a hydrothermal crystal growth method to grow the attractant crystals on the seed crystals. The attractant layer is constituted by the attractant crystals grown on the seed crystals.

The seed crystals of the attractant may be retained in small holes formed on the surface of the heat exchanging member. In this case, it is not necessary to form the seed crystal retaining layer by sintering the retainer particles.

According to the present invention, the attractant layer is uniformly formed and firmly connected to the surface of the heat exchanging member. Therefore, heat absorbed by the attractant layer can be quickly transferred to the heat exchanging member, and the heat exchanger can be made compact in size. Other objects and features of the present invention will become more readily apparent from a better understanding of the preferred embodiments described below with reference to the following drawings.

DETAILED DESCRIPTION OF THE PREFERRED EMBODIMENTS

A first embodiment of the present invention will be described with reference to FIGS. 1-4. First, referring to FIG. 1, an entire structure of a refrigerating system mounted an automotive vehicle will be described. An adsorbing core of the present invention is applied to the refrigerating system. The refrigerating system is composed of a first adsorbing device 10, a second adsorbing device 10', an outer heat exchanger 20, an in-compartment heat exchanger 30, switching valves 41-44, and pumps 45, 46. The first adsorbing device 10 has the same structure as that of the second adsorbing device 10', and the same components are used in both devices 10 and 10'. In the following description, the first and the second adsorbing devices 10 and 10'will be correctively referred to as the adsorbing device 10.

Figure 1:
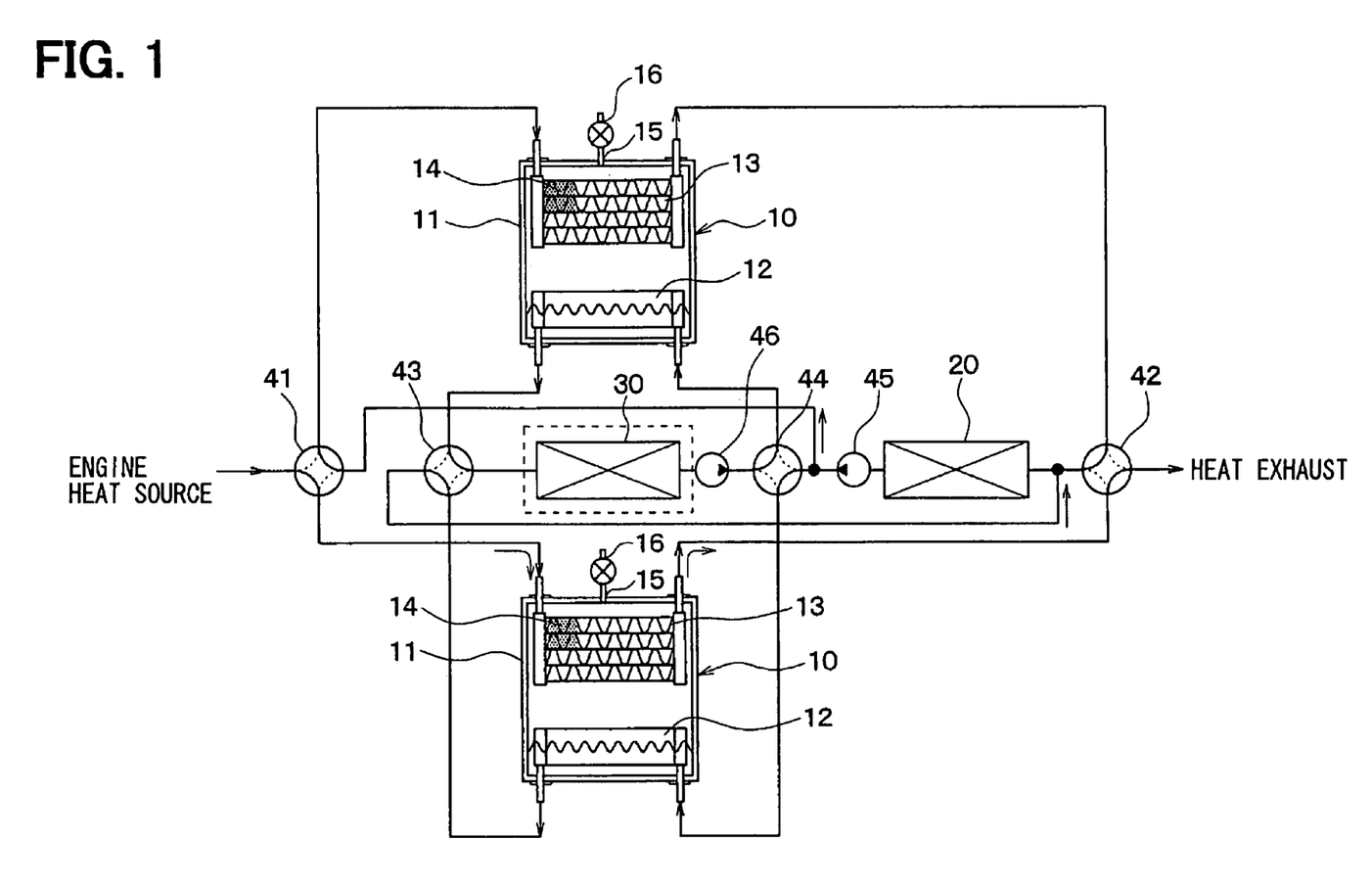
FIG. 1 is a block diagram showing an entire structure of an attractant-type refrigerating system.

The outer heat exchanger 20 is located outside of a passenger compartment. Refrigerant (water mixed with ethyleneglycol-type antifreeze) circulating in the adsorbing device 10, is cooled down in the outer heat exchanger 20 by exchanging heat with outside air. The refrigerant cooled in the adsorbing device 10 circulates in the in-compartment heat exchanger 30 that cools down air in the compartment. The in-compartment heat exchanger 30 is disposed in a casing (not shown) forming a passage for conditioned air, and a blower (not shown) is located at an upstream portion of the passage. Heat generated in a water-cooled internal combustion engine is circulated into the adsorbing device 10 to regenerate attractants of the adsorbing device 10. The switching valves 41-44 are valves for switching circulation paths of the refrigerant. The pumps 45, 46 circulate the refrigerant through passages.

The adsorbing device 10 includes a casing 11 made of stainless steel. An inner space of the casing 11 is maintained at a substantially vacuum, and water as a coolant is contained therein. A first heat exchanger 12 for exchanging heat between the coolant in the casing 11 and the circulating refrigerant and a second heat exchanger 13 for heating or cooling the coolant are contained in the casing 11.

The first heat exchanger 12 is a known heat exchanger having tubes through which the refrigerant flows, header tanks to which the tubes are connected, and fins connected to outside surfaces of the tubes. The first heat exchanger 12 is made of aluminum in this particular embodiment. The second heat exchanger 13 made of copper has a similar structure as the first heat exchanger, except that a fluid-attractant layer 145 (explained later in detail) is formed on the outer surface 13b of the heat exchanging member 13a that includes tubes and fins. Zeolite is used as the attractant layer formed on the outer surface 13b.

An exhaust hole 15 to which a relief valve 16 is connected is positioned on the top of the casing 11. The relief valve 16 is composed of a valve body for opening or closing a valve port and a coil spring biasing the valve body in a direction to close the valve port. When a pressure in the casing rises beyond a predetermined level, the relief valve 16 is opened. The predetermined pressure level is adjusted by controlling a preload of the biasing spring. The switching valves 41-44 and pumps 45, 46 are controlled by a air-conditioner controller to which passenger's commands are inputted from a control panel on a dashboard.

Operation of the refrigerating system will be described below. Upon turning on an operating switch, the pumps 45, 46 start their operation, and the switching valves 41-44 take positions shown in FIG. 1. The first heat exchanger 12 of the first adsorbing device 10 is connected to the in-compartment heat exchanger 30; the second heat exchanger 13 of the first adsorbing device 10 is connected to the outer heat exchanger 20; the first heat exchanger 12' of the second adsorbing device 10' is connected to the outer heat exchanger 20; and the second heat exchanger 13'of the second adsorbing device 10' is connected to a heat source of a internal combustion engine such as a cooling radiator. Thus, the refrigerant in the system is circulated.

The refrigerant flowing through the in-compartment heat exchanger 30 is heated by air in the compartment. The heated refrigerant enters into the first heat exchanger 12, and the coolant in liquid state in the casing 11 evaporates by absorbing heat from the refrigerant flowing through the first heat exchanger 12. The evaporated coolant in gaseous state is attracted to the attractant 14. The gaseous state coolant condenses on the attractant by giving condensing latent heat (that is equal to evaporating latent heat) to the second heat exchanger 13. To quickly dissipate the heat absorbed from the coolant, the refrigerant in the second heat exchanger 13 is circulated through the outer heat exchanger 20. The refrigerant cooled down in the outer heat exchanger 20 returns to the second heat exchanger 13. Thus, the attractant 14 on the second heat exchanger 13 is cooled down. The adsorbing device which is under a process where the coolant is evaporated and the gaseous coolant is attracted to the attractant 14 is referred to as "the adsorbing device under the attracting process."

On the other hand, the refrigerant in the second heat exchanger 13' connected to the heat source of the engine is heated, and thereby coolant condensed on the attractant 14' is heated and evaporated (released from the attractant 14'). Thus, the attractant 14' is regenerated, i.e., the attractant 14' is brought to an active state where the coolant can be attracted again thereto. The refrigerant in the first heat exchanger 12' connected to the outer heat exchanger 20 is cooled down. The coolant in the casing 11' is cooled down by the refrigerant flowing through the first heat exchanger 12', and the coolant is condensed. The adsorbing device which is under a process where the attractant 14 is regenerated and the coolant is condensed is referred to as "the adsorbing device under the releasing process." The situation where the first adsorbing device 10 is under the attracting process and the second adsorbing device 10'is under the releasing process is referred to as a first situation. In this situation, the first heat exchanger 12 functions as an evaporator that evaporates the liquid coolant and performs refrigerating function. The second heat exchanger 13 functions as a cooler for cooling the attractant 14. The first heat exchanger 12' functions as a condenser that condenses the coolant released from the attractant 14' on the second heat exchanger 13'. The second heat exchanger 13' functions as a heater for evaporating the condensed coolant.

When a predetermined time period in the first situation has lapsed, the switching valves 41-44 are turned to positions shown with dotted lines in FIG. 1. At these valve positions, the first heat exchanger 12' is connected to the in-compartment heat exchanger 30; the second heat exchanger 13' is connected to the outer heat exchanger 20; the first heat exchanger 12 is connected to the outer heat exchanger 20; and the second heat exchanger 13 is connected to the heat source of the engine. Thus, the second adsorbing device 10' becomes the adsorbing device under the attracting process, and the first adsorbing device 10 becomes the adsorbing device under the releasing process. This situation is referred to as a second situation.

In the second situation, the first heat exchanger 12'functions as an evaporator that evaporates the liquid coolant and performs refrigerating function. The second heat exchanger 13'functions as a cooler for cooling the attractant 14'. The first heat exchanger 12 functions as a condenser that condenses the coolant released from the attractant 14 on the second heat exchanger 13. The second heat exchanger 13 functions as a heater for evaporating the condensed coolant.

When the predetermined time period in the second situation has lapsed, the switching valves 41-44 are turned again to bring the system to the first situation. The refrigerating system is continuously operated alternately in the first situation and in the second situation. The predetermined time period is properly determined according to an amount of coolant in the casing 11, 11', and attracting ability of the attractant 14, 14'.

Figure 2:
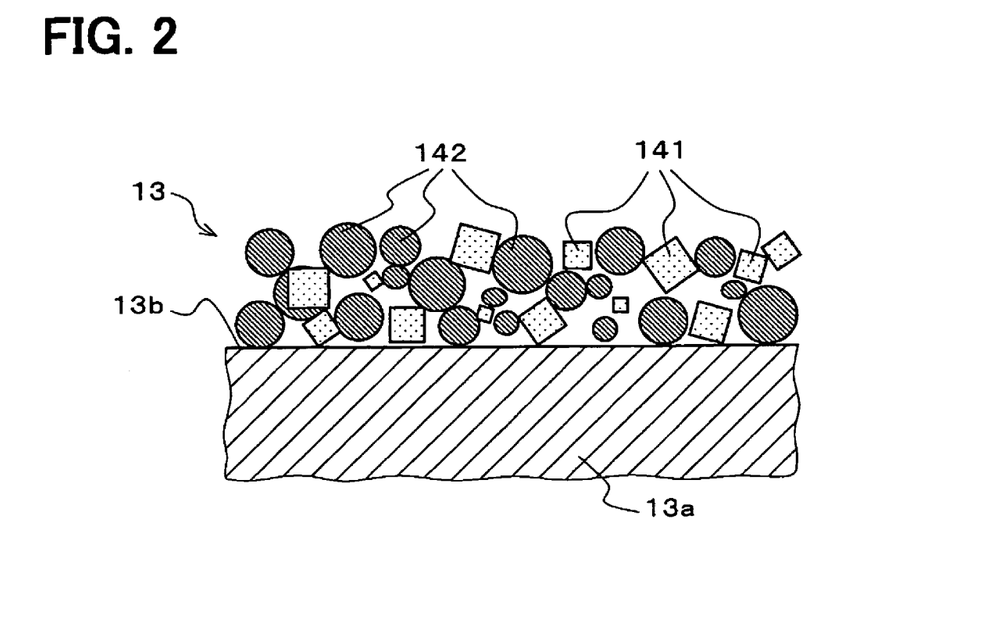
FIG. 2 is a drawing schematically showing a mixture of seed crystals and retainer particles disposed on an outer surface of a heat exchanging member (FIGS. 2-4 showing a first embodiment of the present invention)
Figure 3:
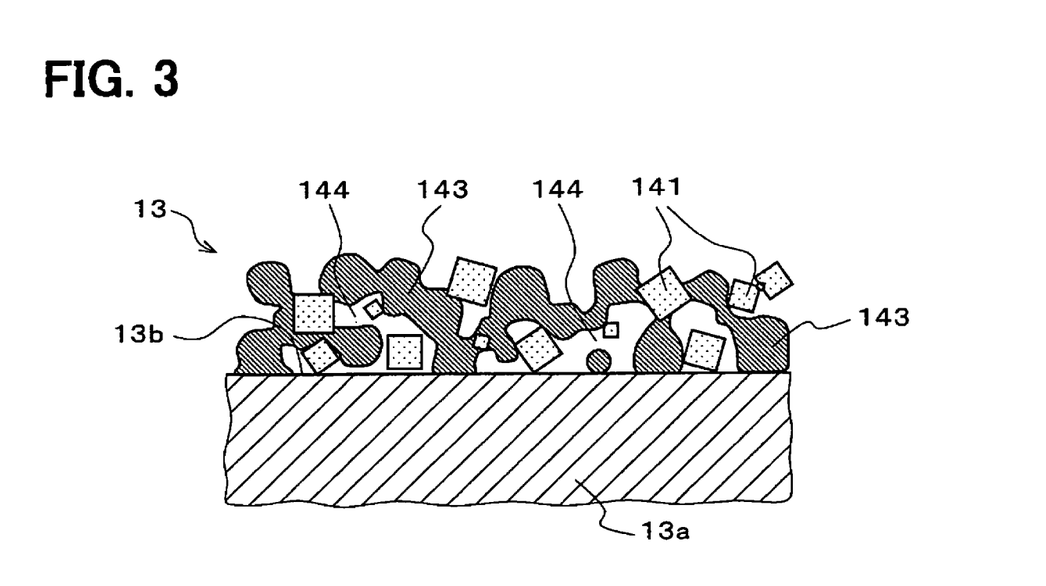
FIG. 3 is a drawing schematically showing a seed crystal retaining layer formed on the outer surface of the heat exchanging member.
Figure 4:
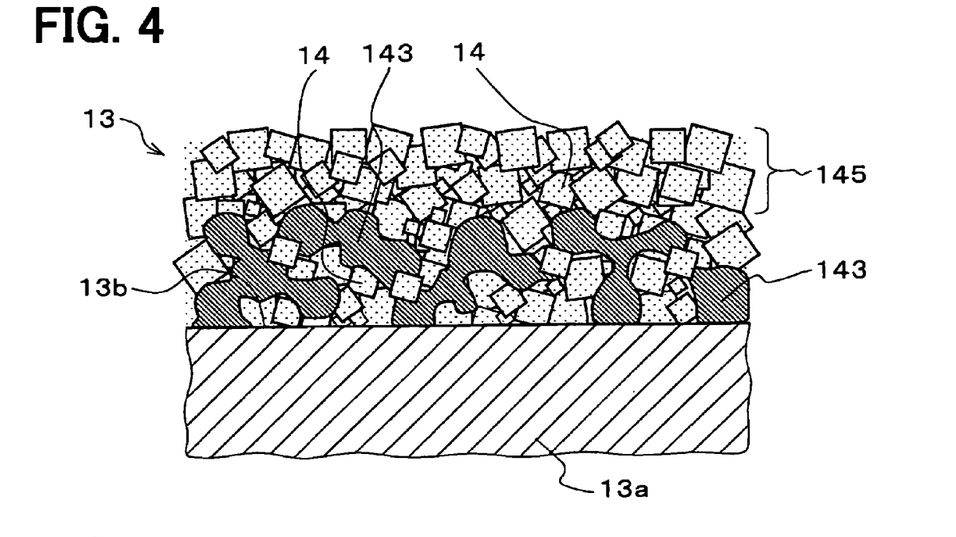
FIG. 4 is a drawing schematically showing an attractant layer formed on the outer surface.

Referring to FIGS. 2-4, a method of manufacturing an adsorbing core composed of a heat exchanging member 13a such as tubes and fines of the second heat exchanger 13 and an attracting layer 145 formed on the outer surface 13b of the heat exchanging member 13a will be described. The second heat exchanger 13 having the tubes and fins is manufactured in a known method. The known method will be briefly explained. First, tubes are inserted into slit holes formed in a header tank, and fins are disposed between tubes. Then the assembled heat exchanger is provisionally fixed with a jig, and other small components are connected by staking or the like. Then, the heat exchanger is heated to melt clad-solder to thereby finally connect components together by soldering.

Now, a method of forming the attractant layer 145 on the heat exchanging member 13a will be described. First, a mixture of seed crystals 141 of the attractant and retainer particles 142 is prepared. In this embodiment, zeolite crystals are used as the seed crystals 141, and copper particles are sued as the retainer particles 142. The zeolite has a structure in which aluminum, phosphor and oxygen are combined. Its melting point is about 1500° C. A maximum diameter L1 of the copper particle is less than 1 mm, and an aspect ratio of the maximum diameter L1 to the minimum diameter L2 (L1/L2) is within a range of 1 to 5 ($1 \leq L1/L2 \leq 5$). A ratio of an average volume Vss of one particle of the seed crystal 141 to an average volume Vms of one particle of the retainer particle 142 is in a range of 0.05 to 20 ($0.05 \leq Vss/Vms \leq 20$). A ratio of a total volume Vst of the seed crystals 142 to a total volume Vmt of the retainer particles 142 is in a range of 0.5 to 2.0 ($0.5 \leq Vst/Vmt \leq 2.0$).

As shown in FIG. 2, the mixture of the seed crystals 141 and the retainer particles 142 is painted on the outer surface 13b of the heat exchanging member 13a such as the tubes and fins of the second heat exchanger 13, 13'. The mixture painted on the outer surface 13b may be pressed to prevent the mixture from peeling off from the outer surface 13b. As shown in FIG. 3, retainer particles 142 in the mixture is connected to the outer surface 13b by sintering, forming a seed crystal retainer layer 143. The seed crystals 141 are retained in inner spaces 144 of the seed crystal retainer layer 143 or connected to it. More particularly, the heat exchanging member 13a, on which the mixture of the seed crystals 141 and the retainer particles 142 is painted, is heated at 700-800° C. to thereby sinter the retainer particles 142 and to connect them to the outer surface 13b. Since a melting point of the seed crystals (zeolite) 141 is about 1500° C., the seed crystals are not melted by this sintering process.

Since the per-particle volume ratio Vss/Vms and the total volume ratio Vst/Vmt of the seed crystals 141 and the retainer particles 142 are set to the levels mentioned above, the seed crystals 141 are held in the inner space 144 as shown in FIG. 3. The refrigerant of the refrigerating system flows through the inner space 144 formed between the outer space 13b and the seed crystal retaining layer 143.

Figure 9A:
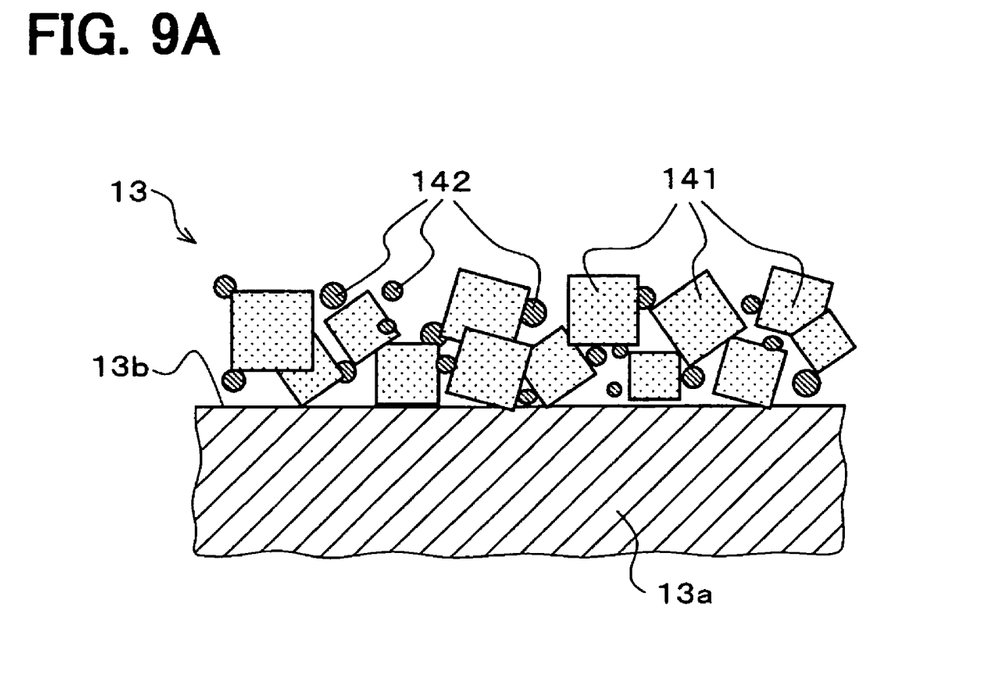
FIG. 9A is a schematic view showing a mixture of seed crystals and retainer particles disposed on the outer surface, the size of the seed crystal being much larger than the size of the retainer particle.
Figure 9B:
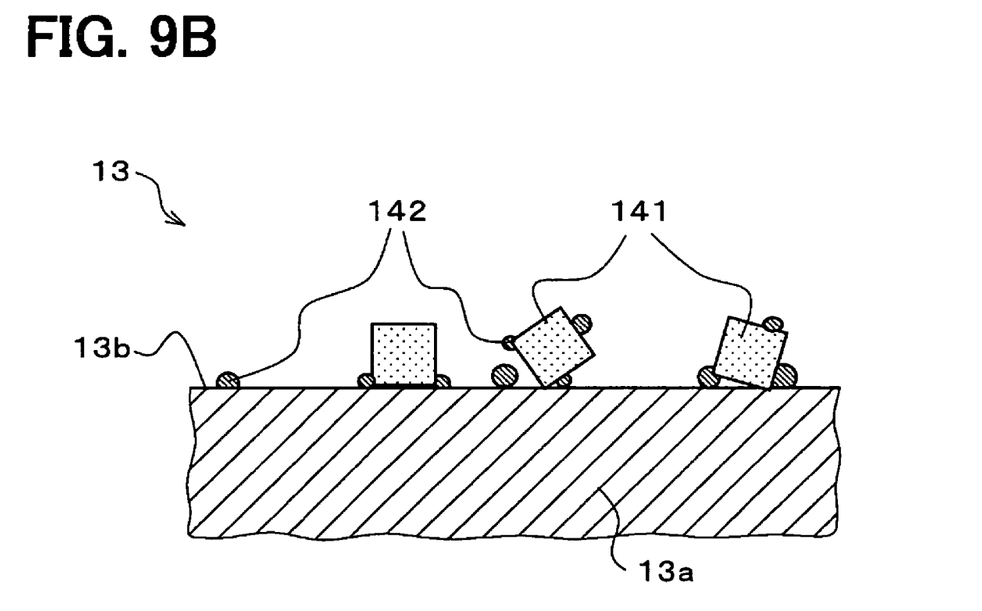
FIG. 9B is a schematic view showing the mixture (shown in FIG. 9A) connected to the outer surface by sintering.
Figure 10A:
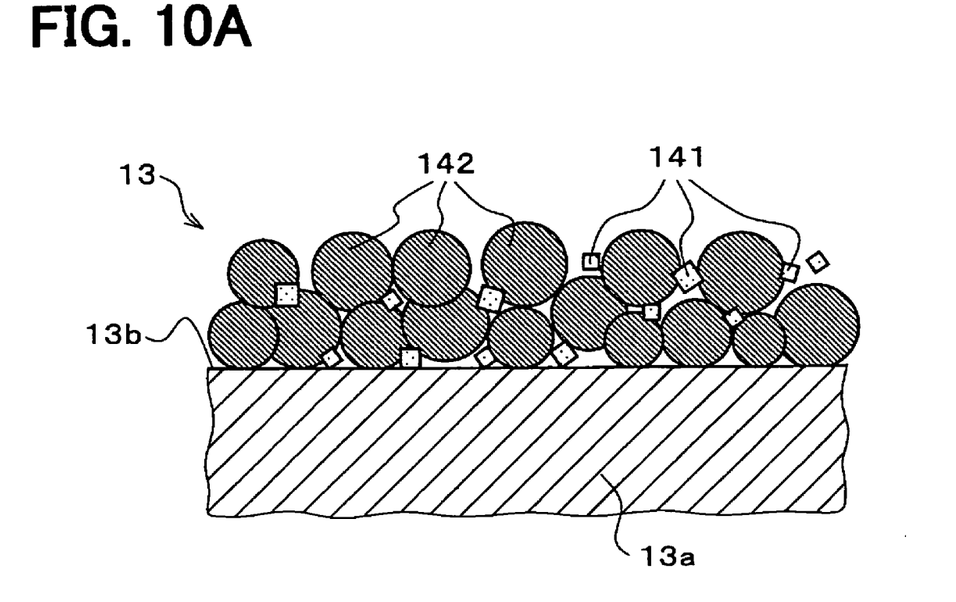
FIG. 10A is a schematic view showing a mixture of seed crystals and retainer particles disposed on the outer surface, the size of the seed crystal being much smaller than the size of the retainer particle.
Figure 10B:
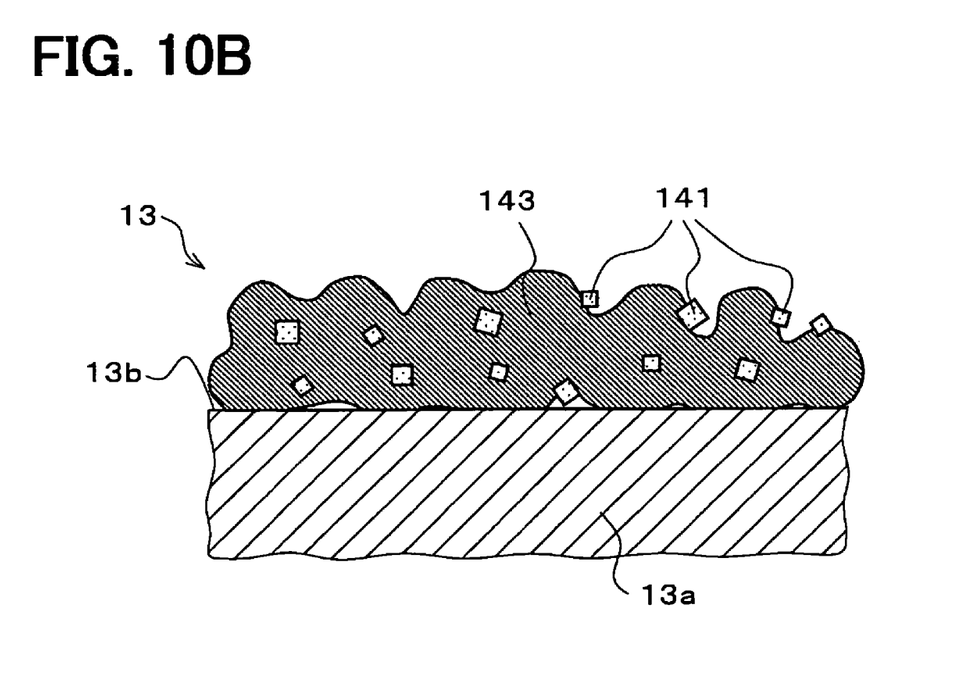
FIG. 10B is a schematic view showing the mixture (shown in FIG. 10A) connected to the outer surface by sintering.

If the per-particle volume ratio Vss/Vms of the seed crystal 141 and the retainer particle 142 is too large beyond the above mentioned range (i.e., larger than 20), the retainer particles 142 cannot contact one another, as shown in FIG. 9A. The retainer particles 142 are not connected to each other even after the sintering process, as shown in FIG. 9B. This means that the seed crystal retaining layer 143 is not formed successfully. On the other hand, if the per-particle volume ratio Vss/Vms is too small beyond the lower limit of the above mentioned range (i.e., smaller than 0.05), the seed crystals 141 completely enter into spaces between the retainer particles 142, as shown in FIG. 10A. When the retainer particles 142 are sintered, the retainer particles 142 completely cover the seed crystals 141, as shown in FIG. 10B. This means that the attractant layer 145 cannot be grown from the seed crystals 141.

Then, as shown in FIG. 4, an attractant layer 145 is grown on the seed crystals 141 by a hydrothermal crystal growth method. In this method, the seed crystals 141 held by the seed crystal retaining layer 143 are grown under presence of vaporized water at a high temperature and a high pressure. The attractant layer 145 is composed of a number of attractants 14. More particularly, sources of phosphor and aluminum are mixed with water, and a template is further mixed with them. As the template, an alicyclic heterocyclic-compound including nitrogen as hetero-atoms may be used. A precursor liquid of the attractants thus prepared is contained in a hermetic vessel having a double structure of stainless steel and Teflon. The heat exchanging member 13a on which the seed crystal retaining layer 143 is formed is put into the vessel containing the precursor liquid.

The vessel containing the precursor liquid and the heat exchanging member 13a is pressurized and heated to 120-180° C. and maintained for a predetermined time period. The pressure in the vessel is determined by partial pressures of evaporated water and the precursor liquid. The pressure in the vessel generally rises up to 1-5 MPa. The time period for performing the hydrothermal crystal growth method is determined by factors such as a size and shape of the vessel, a density of the precursor liquid and an mount of the attractants 14 to be grown. Thus, the attractant layer 145 consisting of attractants 14 is formed on the outer surface 13b, as shown in FIG. 4. The attractants 14 are also formed to fill the inner space 144. The attractant layer 145 is firmly connected to the outer surface 13b of the heat exchanging member 13a together with the seed crystal retaining layer 143. Thus, the adsorbing core composed of the heat exchanging member 13a, the seed crystal retaining layer 143 and the attractant layer 145 is manufactured.

Advantages attained in the first embodiment described above will be summarized below. The attractant seed crystals are held by a seed crystal retaining layer connected to the outer surface of the heat exchanging member, and the attractant layer is grown on the seed crystals. Therefore, the attractant layer is formed to uniformly cover the outer surface and is firmly connected thereto. Accordingly, heat absorbed by the attractants is quickly dissipated in the heat exchanger, and the heat exchanger can be made compact. The liquid coolant attracted to the attractants is vaporized by exhaust heat of the engine to regenerate the attractants. Therefore, energy for operating the refrigerating system can be saved.

The aspect ratio (L1/L2) of the retainer particles is set to a range of 1 to 5, and the largest particle size L1 is set to less than 1 mm. Therefore, the seed crystal retaining layer can be firmly connected to the outer surface of the heat exchanging member. The per-particle volume ratio Vss/Vms and the total volume ratio Vst/Vmt of seed crystals and the retainer particles are set to an adequate ranges. Accordingly, the seed crystal retaining layer can be formed to properly retaining the seed crystals therein. Further, since the melting point of the attractant is higher than that of the retainer particles, the attractant does not melt at the temperature for sintering the retainer particles. Therefore, the attractant layer can be properly grown on the seed crystals.

A second embodiment of the present invention will be described with reference to FIGS. 5-8. In this embodiment, a seed crystal retaining layer 146 is formed in a different manner from that of the first embodiment. Other structures and functions are the same as those of the first embodiment.

Figure 5:
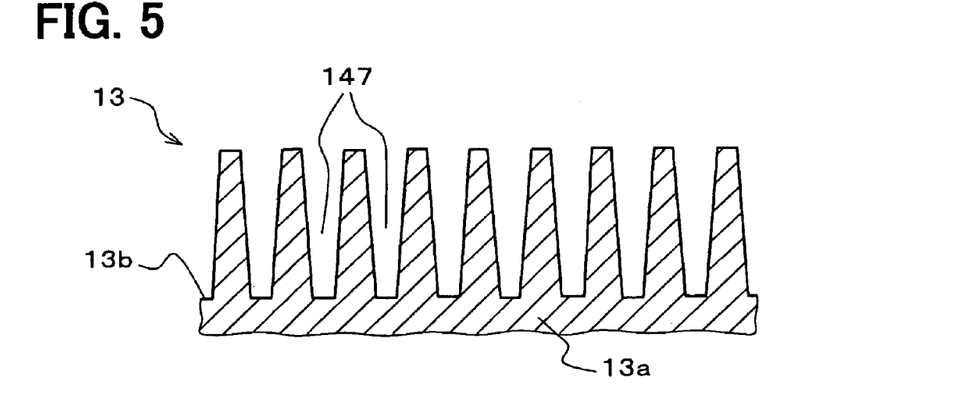
FIG. 5 is a schematic view showing small holes formed on the outer surface of the heat exchanging member (FIGS. 5-8 showing a second embodiment of the present invention)
Figure 6:
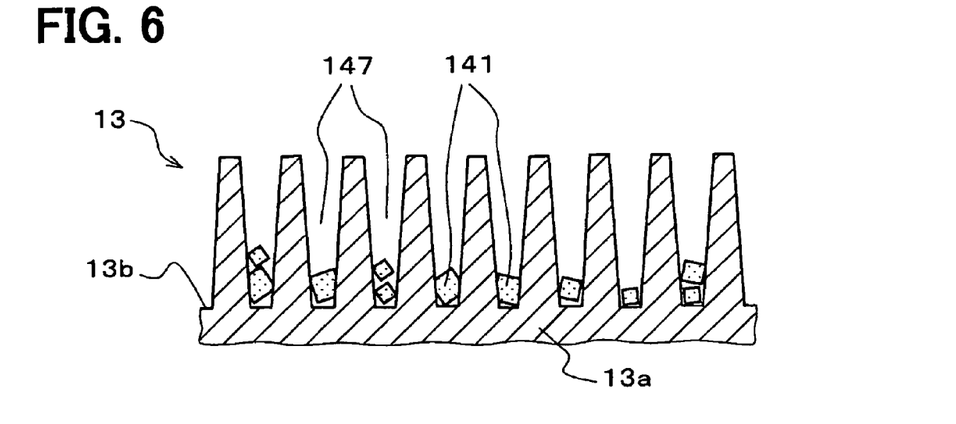
FIG. 6 is a schematic view showing the small holes into which seed crystals are disposed.
Figure 7:
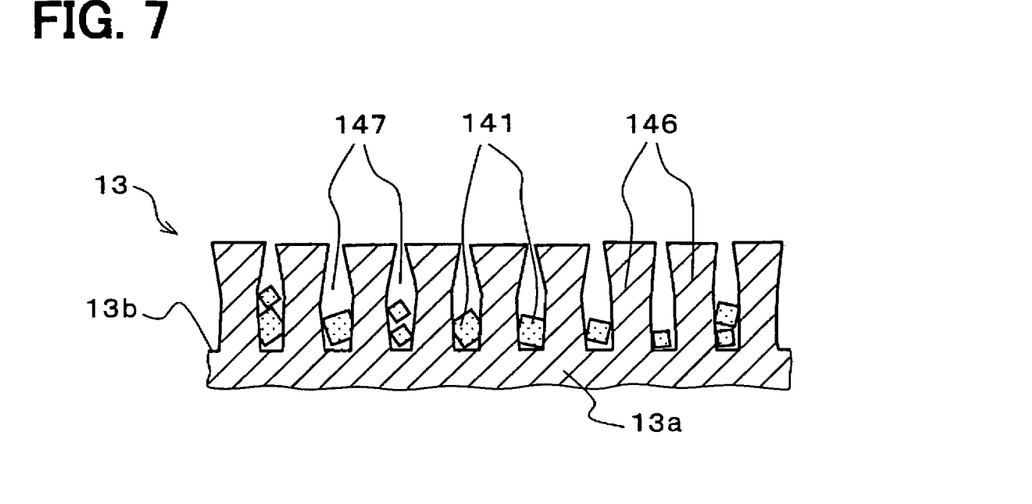
FIG. 7 is a schematic view showing the small holes, openings of which are narrowed.

As shown in FIG. 5, small holes 147 for holding seed crystals 141 therein are formed on the outer surface 13b of the heat exchanging member 13a by machining. Then, as shown in FIG. 6, seed crystals 141 are disposed in the small hales 147. Then, as shown in FIG. 7, openings of the small holes are narrowed by pressing, so that the opening size becomes smaller than the smallest diameter of the seed crystals 141. In other words, the seed crystals 141 are prevented from coming out of the small holes 147. The openings may be narrowed by pressing a flat plate against the openings. Thus, the seed crystal retaining layer 146 is formed on the outer surface 13b.

Figure 8:
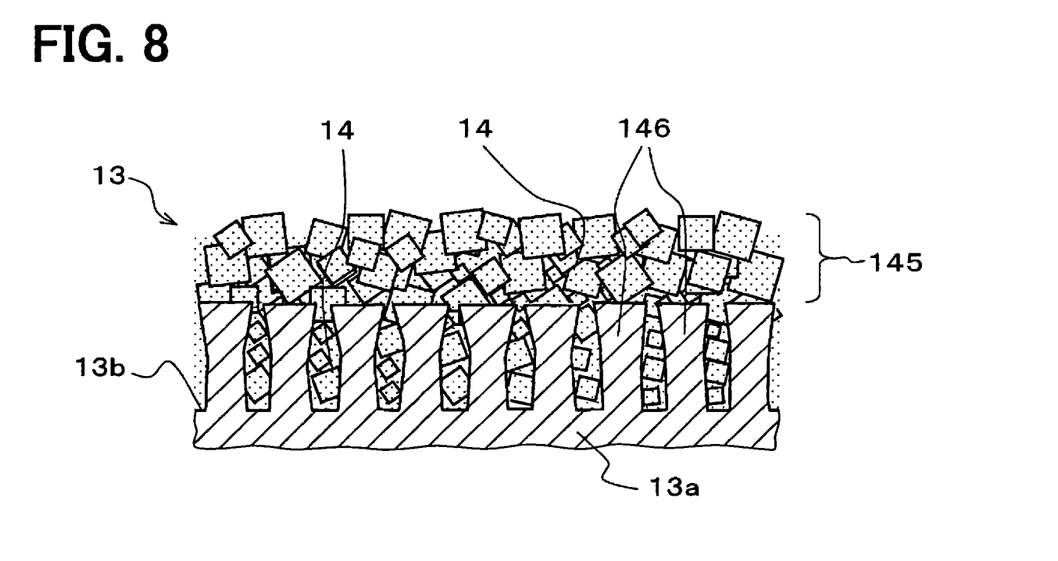
FIG. 8 is a schematic view showing an attractant layer grown on the outer surface.

Then, as shown in FIG. 8, the attractant layer 145 composed of a number of attractants 14 is grown on the seed crystals 141 held in the small holes 147 by the same hydrothermal crystal growth method as that used in the first embodiment.

Since the seed crystals 141 are firmly held in the small holes 147, the attractant layer 145 is firmly connected to the outer surface 13b. Accordingly, the heat absorbed by the attractants from the coolant can be quickly dissipated by the heat exchanger. Since no retainer particles are used in this embodiment, the attractant layer 145 can be solely composed of the attractants 14 such as zeolite.

The present invention is not limited to the embodiments described above, but it may be variously modified. For example, though the copper particles are used as the retainer particles 142 in the first embodiment, other metallic particles such as silver, aluminum, gold, magnesium or a mixture thereof may be used in place of the copper particles. Though the mixture of the seed crystals 141 and the retainer particles 142 is painted on the outer surface 13b, an organic solution in which the seed crystals 141 and the retainer particles 142 are dispersed may be painted on the outer surface 13b. In this manner, the seed crystals 141 and the retainer particles 142 can be firmly attached to the outer surface 13b. In this case, the hydrothermal crystal growth is carried out after the organic solution is evaporated. Though the small holes 147 are formed by machining in the second embodiment, they may be formed by other methods such as drilling, sand-blast, shot-blast or etching. Though the second heat exchanger 13, 13' is made of copper in the foregoing embodiments, it may be made of other metals such as aluminum. The present invention may be applied to other devices than the adsorbing type refrigerator for an automobile. For example, it may be applied to a stationary air-conditioning system.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An adsorbing core of a heat exchanger comprising:
a heat exchanging member forming a heat exchanger through which refrigerant flows; and
an attractant layer connected to a surface of the heat exchanging member, the attractant layer attracting gaseous coolant contacting the heat exchanging member to liquefy the gaseous coolant by absorbing heat from the gaseous coolant and releasing the liquid coolant by giving heat to the liquid coolant, wherein:
the attractant layer is grown from seed crystals of attractants retained by a seed crystal retaining layer connected to the surface of the heat exchanging member, the seed crystal retaining layer being formed by connecting the seed crystals of the attractants and retainer particles.

2. The adsorbing core as in claim 1, wherein:
the seed crystal retaining layer is connected to the surface of the heat exchanging member by sintering a mixture of the seed crystals and the retainer particles.

3. The adsorbing core as in claim 1, wherein:
inner spaces, in which the gaseous coolant contacts the surface of the heat exchanging member, are formed in the seed crystal retaining layer.

4. The adsorbing core as in claim 1, wherein:
the retainer particles are particles of a metallic material.

5. The adsorbing core as in claim 1, wherein:
a melting point of the seed crystals is higher than that of the retainer particles.

6. An adsorbing core of a heat exchanger comprising: and
a heat exchanging member forming a heat exchanger through which refrigerant flows;
an attractant layer connected to a surface of the heat exchanging member, the attractant layer attracting gaseous coolant contacting the heat exchanging member to liquefy the gaseous coolant by absorbing heat from the gaseous coolant and releasing the liquid coolant by giving heat to the liquid coolant, wherein:
the attractant layer is grown from seed crystals of attractants retained by a seed crystal retaining layer, the seed crystal retaining layer being composed of small holes formed on the surface of the heat exchanging member, openings of the small holes being narrowed to a size not exceeding a minimum particle size of the seed crystals to thereby retain the seed crystals in the small holes.

7. The adsorbing core as in claim 1, wherein: the attracting layer is composed of only the attractants which are grown from the seed crystals.

8. A heat exchanger comprising the adsorbing core defined in claim 1.

9. A method of manufacturing an adsorbing core for use in a heat exchanger, the adsorbing core having a heat exchanging member forming the heat exchanger through which refrigerant flows and an attractant layer connected to a surface of the heat exchanging member, the attractant layer contacting gaseous coolant from which heat is absorbed to liquefy the gaseous coolant and to which heat is given to evaporate the liquid coolant, the method comprising:

connecting a seed crystal retaining layer, in which seed crystals of the attractants and retainer particles are mixed, to the surface of the heat exchanging member by sintering the retainer particles and     growing the attractant layer on the seed crystals by hydrothermal crystal growth method.

10. The method of manufacturing an adsorbing core as in claim 9, wherein:

a per-particle volume ratio of the seed crystal of the attractant to the retainer particle, both mixed in the seed crystal retaining layer, is within a range from 0.05 to 20.

11. The method of manufacturing an adsorbing core as in claim 9, wherein:

a total volume ratio of the seed crystals of the attractants to the retainer particles, both mixed in the seed crystal retaining layer, is within a range from 0.5 to 2.0.

12. A method of manufacturing an adsorbing core for use in a heat exchanger, the adsorbing core having a heat exchanging member forming the heat exchanger through which refrigerant flows and an attractant layer connected to a surface of the heat exchanging member, the attractant layer contacting gaseous coolant from which heat is absorbed to liquefy the gaseous coolant and to which heat is given to evaporate the liquid coolant, the method comprising:

forming a number of small holes on a surface of the heat exchanging member;

inserting seed crystals of the attractants into the small holes from openings thereof;

narrowing the openings of the small holes to a size not exceeding a smallest size of the seed crystals to thereby retain the seed crystals in the small holes; and     growing the attractant layer on the seed crystals by hydrothermal crystal growth method.

13. The method of manufacturing an adsorbing core as in claim 12, wherein:

the small holes are formed by machining.

14. The method of manufacturing an adsorbing core as in claim 12, wherein:

the small holes are formed by etching.

15. The method of manufacturing an adsorbing core as in claim 12, wherein:

the small holes are formed by sand-blasting.

16. The method of manufacturing an adsorbing core as in claim 12, wherein:

the openings of the small holes are narrowed by pressing the openings.

17. The adsorbing core as in claim 6, wherein: the attractant layer is composed of only the attractants which are grown from the seed crystals.

18. A heat exchanger comprising the adsorbing core defined in claim 6.

* * * * *